US008727866B2

(12) United States Patent
Singer et al.

(10) Patent No.: US 8,727,866 B2
(45) **Date of Patent: *May 20, 2014**

(54) GAMING DEVICE HAVING A PLURALITY OF WILDCARD SYMBOL PATTERNS

(71) Applicant: IGT, Reno, NV (US)

(72) Inventors: Anthony M. Singer, Saddle River, NJ (US); Daniel M. Marks, Decatur, GA (US); Howard M. Marks, Decatur, GA (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/855,339

(22) Filed: Apr. 2, 2013

(65) Prior Publication Data

US 2013/0225257 A1 Aug. 29, 2013

Related U.S. Application Data

(63) Continuation of application No. 13/272,765, filed on Oct. 13, 2011, now Pat. No. 8,419,524, which is a continuation of application No. 11/253,214, filed on Oct. 18, 2005, now Pat. No. 8,043,155.

(60) Provisional application No. 60/619,806, filed on Oct. 18, 2004, provisional application No. 60/673,293, filed on Apr. 20, 2005.

(51) Int. Cl.
*A63F 9/24* (2006.01)
*A63F 13/00* (2006.01)

(52) U.S. Cl.
USPC .................. 463/20; 463/18; 463/19; 463/21; 463/31

(58) Field of Classification Search
USPC .......................................................... 463/21
See application file for complete search history.

(56) References Cited

U.S. PATENT DOCUMENTS

| | | | |
|---|---|---|---|
| 3,831,172 | A | 8/1974 | Olliges et al. |
| 3,834,712 | A | 9/1974 | Cox |
| 4,184,683 | A | 1/1980 | Hooker |
| 4,300,225 | A | 11/1981 | Lambl |
| 4,314,236 | A | 2/1982 | Mayer et al. |
| 4,339,798 | A | 7/1982 | Hedges et al. |
| 4,344,345 | A | 8/1982 | Sano |
| 4,363,482 | A | 12/1982 | Goldfarb |

(Continued)

FOREIGN PATENT DOCUMENTS

| | | | |
|---|---|---|---|
| AU | 199717601 | B2 | 9/1997 |
| AU | 199747657 | B2 | 11/1997 |

(Continued)

OTHER PUBLICATIONS

Boot Scootin Article, written by Strictly Slots/Aristocrat Leisure Industries, PTY Ltd., published prior to Oct. 2005.

(Continued)

*Primary Examiner* — Steven J Hylinski
(74) *Attorney, Agent, or Firm* — Neal, Gerber & Eisenberg LLP

(57) ABSTRACT

A gaming device which includes a variety of methods to allow the player to select patterns of wildcard symbols, from a plurality of wildcard symbol patterns, and use those patterns during subsequent games. One embodiment allows the player to select a pattern of wildcard symbols and use the selected pattern during a free spin bonus game.

20 Claims, 7 Drawing Sheets

(56) References Cited

U.S. PATENT DOCUMENTS

| | | | |
|---|---|---|---|
| RE31,441 | E | 11/1983 | Nutting et al. |
| 4,496,149 | A | 1/1985 | Schwartzberg |
| 4,582,324 | A | 4/1986 | Koza et al. |
| 4,618,150 | A | 10/1986 | Kimura |
| 4,624,459 | A | 11/1986 | Kaufman |
| 4,648,600 | A | 3/1987 | Olliges |
| 4,660,107 | A | 4/1987 | Chippendale, Jr. |
| 4,695,053 | A | 9/1987 | Vazquez, Jr. et al. |
| 4,712,189 | A | 12/1987 | Mohri |
| 4,732,386 | A | 3/1988 | Rayfiel |
| 4,733,593 | A | 3/1988 | Rothbart |
| 4,791,558 | A | 12/1988 | Chaitin et al. |
| 4,817,951 | A | 4/1989 | Crouch et al. |
| 4,836,546 | A | 6/1989 | Dire et al. |
| 4,876,937 | A | 10/1989 | Suzuki |
| 4,961,575 | A | 10/1990 | Perry |
| 4,974,483 | A | 12/1990 | Luzzatto |
| 4,974,857 | A | 12/1990 | Beall et al. |
| 5,019,973 | A | 5/1991 | Wilcox et al. |
| 5,046,735 | A | 9/1991 | Hamano et al. |
| 5,096,195 | A | 3/1992 | Gimmon |
| 5,098,107 | A | 3/1992 | Boylan et al. |
| 5,119,465 | A | 6/1992 | Jack |
| 5,163,131 | A | 11/1992 | Row et al. |
| 5,179,517 | A | 1/1993 | Sarbin et al. |
| 5,221,801 | A | 6/1993 | Bruti et al. |
| 5,223,828 | A | 6/1993 | McKiel, Jr. |
| 5,242,163 | A | 9/1993 | Fulton |
| 5,258,574 | A | 11/1993 | Kawano |
| 5,265,877 | A | 11/1993 | Boylan |
| 5,266,736 | A | 11/1993 | Saito |
| 5,275,400 | A | 1/1994 | Weingardt et al. |
| 5,282,633 | A | 2/1994 | Boylan et al. |
| 5,287,102 | A | 2/1994 | McKiel, Jr. |
| 5,308,065 | A | 5/1994 | Bridgeman et al. |
| 5,331,112 | A | 7/1994 | Sato et al. |
| 5,332,219 | A | 7/1994 | Marnell et al. |
| 5,332,228 | A | 7/1994 | Schultz |
| 5,342,047 | A | 8/1994 | Heidel et al. |
| 5,371,345 | A | 12/1994 | LeStrange et al. |
| 5,373,440 | A | 12/1994 | Cohen et al. |
| 5,390,938 | A | 2/1995 | Takeya |
| 5,393,061 | A | 2/1995 | Manship et al. |
| 5,393,070 | A | 2/1995 | Best |
| 5,423,539 | A | 6/1995 | Nagao |
| 5,429,507 | A | 7/1995 | Kaplan |
| 5,430,835 | A | 7/1995 | Williams et al. |
| 5,431,408 | A | 7/1995 | Adams |
| 5,446,902 | A | 8/1995 | Islam |
| 5,449,173 | A | 9/1995 | Thomas et al. |
| 5,469,511 | A | 11/1995 | Lewis et al. |
| 5,470,233 | A | 11/1995 | Fruchterman et al. |
| 5,472,197 | A | 12/1995 | Gwiasda et al. |
| 5,508,699 | A | 4/1996 | Silverman |
| 5,515,764 | A | 5/1996 | Rosen |
| 5,547,201 | A | 8/1996 | Honeywill |
| 5,577,253 | A | 11/1996 | Blickstein |
| 5,580,053 | A | 12/1996 | Crouch |
| 5,606,144 | A | 2/1997 | Dabby |
| 5,611,535 | A | 3/1997 | Tiberio |
| 5,625,845 | A | 4/1997 | Allran |
| 5,655,961 | A | 8/1997 | Acres et al. |
| 5,668,996 | A | 9/1997 | Radinsky |
| 5,685,774 | A | 11/1997 | Webb |
| 5,695,188 | A | 12/1997 | Ishibashi |
| 5,697,843 | A | 12/1997 | Manship et al. |
| 5,702,304 | A | 12/1997 | Acres et al. |
| 5,703,310 | A | 12/1997 | Kurakake et al. |
| 5,704,835 | A | 1/1998 | Dietz, II |
| 5,707,286 | A | 1/1998 | Carlson |
| 5,715,459 | A | 2/1998 | Celi |
| 5,741,183 | A | 4/1998 | Acres et al. |
| 5,745,761 | A | 4/1998 | Celi |
| 5,745,762 | A | 4/1998 | Celi |
| 5,752,882 | A | 5/1998 | Acres et al. |
| 5,758,875 | A | 6/1998 | Giacalone, Jr. |
| 5,762,552 | A | 6/1998 | Vuong et al. |
| 5,766,074 | A | 6/1998 | Cannon et al. |
| 5,769,716 | A | 6/1998 | Saffari et al. |
| 5,772,506 | A | 6/1998 | Marks et al. |
| 5,772,509 | A | 6/1998 | Weiss |
| 5,778,231 | A | 7/1998 | Van Hoff |
| 5,792,972 | A | 8/1998 | Houston |
| 5,802,364 | A | 9/1998 | Senator |
| 5,807,172 | A | 9/1998 | Piechowiak |
| 5,809,303 | A | 9/1998 | Senator |
| 5,810,361 | A | 9/1998 | Kadlic |
| 5,820,459 | A | 10/1998 | Acres et al. |
| 5,823,873 | A | 10/1998 | Moody |
| 5,833,538 | A | 11/1998 | Weiss |
| 5,836,817 | A | 11/1998 | Acres et al. |
| 5,839,958 | A | 11/1998 | Ozarow et al. |
| 5,848,932 | A | 12/1998 | Adams |
| 5,854,927 | A | 12/1998 | Gelissen |
| 5,876,284 | A | 3/1999 | Acres et al. |
| 5,880,386 | A | 3/1999 | Wachi et al. |
| 5,882,261 | A | 3/1999 | Adams |
| 5,889,990 | A | 3/1999 | Coleman |
| 5,892,171 | A | 4/1999 | Ide |
| 5,902,184 | A | 5/1999 | Bennett et al. |
| 5,908,354 | A | 6/1999 | Okuniewicz |
| 5,910,048 | A | 6/1999 | Feinberg |
| 5,911,071 | A | 6/1999 | Jordan |
| 5,920,720 | A | 7/1999 | Toutinghi |
| 5,920,842 | A | 7/1999 | Cooper et al. |
| 5,923,878 | A | 7/1999 | Marsland |
| 5,923,880 | A | 7/1999 | Rose |
| 5,930,509 | A | 7/1999 | Yates |
| 5,937,193 | A | 8/1999 | Evoy |
| 5,946,487 | A | 8/1999 | Dangelo |
| 5,946,489 | A | 8/1999 | Yellin |
| 5,947,821 | A | 9/1999 | Stone |
| 5,951,397 | A | 9/1999 | Dickinson |
| 5,964,846 | A | 10/1999 | Berry |
| 5,966,535 | A | 10/1999 | Benedikt |
| 5,967,894 | A | 10/1999 | Kinoshita et al. |
| 5,970,143 | A | 10/1999 | Schneier et al. |
| 5,970,249 | A | 10/1999 | Holze |
| 5,976,016 | A | 11/1999 | Moody et al. |
| 5,978,585 | A | 11/1999 | Crelier |
| 5,980,384 | A | 11/1999 | Barrie |
| 5,997,400 | A | 12/1999 | Seelig et al. |
| 5,997,401 | A | 12/1999 | Crawford |
| 5,999,731 | A | 12/1999 | Yellin |
| 6,003,038 | A | 12/1999 | Chen |
| 6,004,207 | A | 12/1999 | Wilson, Jr. et al. |
| 6,012,720 | A | 1/2000 | Webb |
| 6,015,346 | A | 1/2000 | Bennett |
| D421,277 | S | 2/2000 | McGahn et al. |
| 6,019,364 | A | 2/2000 | Svyatsky et al. |
| 6,021,272 | A | 2/2000 | Cahill |
| 6,021,273 | A | 2/2000 | Criesemer |
| 6,026,238 | A | 2/2000 | Bond |
| 6,027,115 | A | 2/2000 | Griswold et al. |
| 6,029,000 | A | 2/2000 | Woolsey |
| 6,031,993 | A | 2/2000 | Andrews |
| 6,033,307 | A | 3/2000 | Vancura |
| 6,035,120 | A | 3/2000 | Ravichandran |
| 6,052,527 | A | 4/2000 | Delcourt et al. |
| 6,056,641 | A | 5/2000 | Webb |
| 6,056,642 | A | 5/2000 | Bennett |
| 6,059,289 | A | 5/2000 | Vancura |
| 6,059,658 | A | 5/2000 | Mangano et al. |
| 6,062,979 | A | 5/2000 | Inoue |
| 6,066,181 | A | 5/2000 | DeMaster |
| 6,071,192 | A | 6/2000 | Weiss |
| 6,074,432 | A | 6/2000 | Guccione |
| 6,075,940 | A | 6/2000 | Gosling |
| 6,084,169 | A | 7/2000 | Hasegawa et al. |
| 6,089,976 | A | 7/2000 | Schneider et al. |
| 6,089,977 | A | 7/2000 | Bennett |
| 6,089,978 | A | 7/2000 | Adams |
| 6,092,147 | A | 7/2000 | Levy |
| 6,093,102 | A | 7/2000 | Bennett |

(56) References Cited

U.S. PATENT DOCUMENTS

| | | | |
|---|---|---|---|
| 6,096,095 | A | 8/2000 | Halstead |
| 6,102,400 | A | 8/2000 | Scott et al. |
| 6,102,798 | A | 8/2000 | Bennett |
| 6,103,964 | A | 8/2000 | Kay |
| 6,106,393 | A | 8/2000 | Sunaga et al. |
| 6,110,041 | A | 8/2000 | Walker et al. |
| 6,110,043 | A | 8/2000 | Olsen |
| 6,110,226 | A | 8/2000 | Bothner |
| 6,113,495 | A | 9/2000 | Walker |
| 6,117,009 | A | 9/2000 | Yoseloff |
| 6,120,031 | A | 9/2000 | Adams |
| 6,120,378 | A | 9/2000 | Moody et al. |
| 6,126,165 | A | 10/2000 | Sakamoto |
| 6,131,191 | A | 10/2000 | Cierniak |
| 6,138,273 | A | 10/2000 | Sturges |
| 6,141,794 | A | 10/2000 | Dice |
| 6,142,875 | A | 11/2000 | Kodachi et al. |
| 6,146,273 | A | 11/2000 | Olsen |
| 6,146,276 | A | 11/2000 | Okuniewicz |
| 6,155,925 | A | 12/2000 | Giobbi et al. |
| 6,159,095 | A | 12/2000 | Frohm et al. |
| 6,159,096 | A | 12/2000 | Yoseloff |
| 6,159,097 | A | 12/2000 | Gura |
| 6,159,098 | A | 12/2000 | Slomiany et al. |
| 6,162,122 | A | 12/2000 | Acres et al. |
| 6,174,233 | B1 | 1/2001 | Sunaga et al. |
| 6,174,235 | B1 | 1/2001 | Walker et al. |
| 6,175,632 | B1 | 1/2001 | Marx |
| 6,176,487 | B1 | 1/2001 | Eklund et al. |
| 6,190,254 | B1 | 2/2001 | Bennett |
| 6,190,255 | B1 | 2/2001 | Thomas et al. |
| 6,198,395 | B1 | 3/2001 | Sussman |
| 6,210,279 | B1 | 4/2001 | Dickinson |
| 6,217,448 | B1 | 4/2001 | Olsen |
| 6,220,959 | B1 | 4/2001 | Holmes, Jr. et al. |
| 6,227,971 | B1 | 5/2001 | Weiss |
| 6,233,731 | B1 | 5/2001 | Bond et al. |
| 6,234,897 | B1 | 5/2001 | Frohm et al. |
| 6,237,916 | B1 | 5/2001 | Webb |
| 6,238,288 | B1 | 5/2001 | Walker et al. |
| 6,241,612 | B1 | 6/2001 | Heredia |
| 6,251,013 | B1 | 6/2001 | Bennett |
| 6,254,481 | B1 | 7/2001 | Jaffe |
| 6,257,981 | B1 | 7/2001 | Acres et al. |
| 6,261,177 | B1 | 7/2001 | Bennett |
| 6,261,178 | B1 | 7/2001 | Bennett |
| 6,270,411 | B1 | 8/2001 | Gura et al. |
| 6,270,412 | B1 | 8/2001 | Crawford et al. |
| 6,290,600 | B1 | 9/2001 | Glasson |
| 6,293,869 | B1 | 9/2001 | Kwan et al. |
| 6,295,638 | B1 | 9/2001 | Brown et al. |
| 6,299,165 | B1 | 10/2001 | Nagano |
| 6,299,170 | B1 | 10/2001 | Yoseloff |
| 6,302,398 | B1 | 10/2001 | Vecchio |
| 6,302,790 | B1 | 10/2001 | Brossard |
| 6,306,034 | B1 | 10/2001 | Sakamoto et al. |
| 6,309,299 | B1 | 10/2001 | Weiss |
| 6,309,301 | B1 | 10/2001 | Sano |
| 6,311,976 | B1 | 11/2001 | Yoseloff et al. |
| 6,311,982 | B1 | 11/2001 | Lebensfeld et al. |
| 6,319,124 | B1 | 11/2001 | Baerlocher et al. |
| 6,319,125 | B1 | 11/2001 | Acres |
| 6,321,323 | B1 | 11/2001 | Nugroho et al. |
| 6,322,078 | B1 | 11/2001 | Adams |
| 6,328,648 | B1 | 12/2001 | Walker et al. |
| 6,331,143 | B1 | 12/2001 | Yoseloff |
| 6,334,814 | B1 | 1/2002 | Adams |
| 6,336,860 | B1 | 1/2002 | Webb |
| 6,346,043 | B1 | 2/2002 | Colin et al. |
| 6,358,144 | B1 | 3/2002 | Kadlic et al. |
| 6,358,147 | B1 | 3/2002 | Jaffe et al. |
| 6,364,768 | B1 | 4/2002 | Acres et al. |
| 6,375,568 | B1 | 4/2002 | Roffman et al. |
| 6,375,569 | B1 | 4/2002 | Acres |
| 6,390,923 | B1 | 5/2002 | Yoshitomi et al. |
| 6,409,596 | B1 | 6/2002 | Hayashida et al. |
| 6,413,162 | B1 | 7/2002 | Baerlocher et al. |
| 6,416,411 | B1 | 7/2002 | Tsukahara |
| 6,419,579 | B1 | 7/2002 | Bennett |
| 6,428,412 | B1 | 8/2002 | Anderson et al. |
| 6,439,993 | B1 | 8/2002 | O'halloran |
| 6,439,995 | B1 | 8/2002 | Hughs-Baird et al. |
| 6,443,837 | B1 | 9/2002 | Jaffe et al. |
| 6,454,266 | B1 | 9/2002 | Breeding et al. |
| RE37,885 | E | 10/2002 | Acres et al. |
| 6,491,584 | B2 | 12/2002 | Graham et al. |
| 6,494,454 | B2 | 12/2002 | Adams |
| 6,494,785 | B1 | 12/2002 | Gerrard et al. |
| 6,504,089 | B1 | 1/2003 | Negishi et al. |
| 6,514,141 | B1 | 2/2003 | Kaminkow et al. |
| 6,516,466 | B1 | 2/2003 | Jackson |
| 6,517,432 | B1 | 2/2003 | Jaffe |
| 6,517,433 | B2 | 2/2003 | Loose et al. |
| 6,520,855 | B2 | 2/2003 | DeMar et al. |
| 6,533,658 | B1 | 3/2003 | Walker et al. |
| 6,533,660 | B2 | 3/2003 | Seelig et al. |
| 6,537,152 | B2 | 3/2003 | Seelig et al. |
| 6,544,122 | B2 | 4/2003 | Araki et al. |
| 6,551,187 | B1 | 4/2003 | Jaffe |
| 6,554,703 | B1 | 4/2003 | Bussick et al. |
| 6,561,900 | B1 | 5/2003 | Baerlocher et al. |
| 6,561,904 | B2 | 5/2003 | Locke et al. |
| 6,561,908 | B1 | 5/2003 | Hoke |
| 6,565,433 | B1 | 5/2003 | Baerlocher et al. |
| 6,565,434 | B1 | 5/2003 | Acres |
| 6,565,436 | B1 | 5/2003 | Baerlocher |
| 6,581,935 | B1 | 6/2003 | Odom |
| 6,592,457 | B1 | 7/2003 | Frohm et al. |
| 6,599,195 | B1 | 7/2003 | Araki et al. |
| 6,602,136 | B1 | 8/2003 | Baerlocher et al. |
| 6,604,740 | B1 | 8/2003 | Singer et al. |
| 6,604,999 | B2 | 8/2003 | Ainsworth |
| 6,616,142 | B2 | 9/2003 | Adams |
| 6,632,139 | B1 | 10/2003 | Baerlocher |
| 6,632,140 | B2 | 10/2003 | Berman et al. |
| 6,638,169 | B2 | 10/2003 | Wilder et al. |
| 6,648,758 | B2 | 11/2003 | Bennett et al. |
| 6,656,046 | B1 | 12/2003 | Yoseloff et al. |
| 6,669,559 | B1 | 12/2003 | Baerlocher et al. |
| 6,682,073 | B2 | 1/2004 | Bryant et al. |
| 6,729,618 | B1 | 5/2004 | Koenig et al. |
| 6,731,313 | B1 | 5/2004 | Kaminkow |
| 6,739,973 | B1 | 5/2004 | Lucchesi et al. |
| 6,749,502 | B2 | 6/2004 | Baerlocher |
| 6,755,738 | B2 | 6/2004 | Glasson et al. |
| 6,761,632 | B2 | 7/2004 | Bansemer et al. |
| 6,769,985 | B1 | 8/2004 | Laakso et al. |
| 6,780,109 | B2 | 8/2004 | Kaminkow |
| 6,805,349 | B2 | 10/2004 | Baerlocher et al. |
| 6,805,632 | B2 | 10/2004 | Suda |
| 6,810,517 | B2 | 10/2004 | Bond et al. |
| 6,835,132 | B2 | 12/2004 | Bennett |
| 6,848,996 | B2 | 2/2005 | Hecht et al. |
| 6,855,053 | B2 | 2/2005 | Baerlocher |
| 6,866,583 | B2 | 3/2005 | Glavich et al. |
| 6,878,061 | B2 | 4/2005 | Baerlocher et al. |
| 6,905,406 | B2 | 6/2005 | Kaminkow et al. |
| 6,910,962 | B2 | 6/2005 | Marks et al. |
| 6,921,335 | B2 | 7/2005 | Rodgers et al. |
| 6,929,952 | B2 | 8/2005 | Baerlocher |
| 6,935,947 | B1 | 8/2005 | Singer et al. |
| 6,935,955 | B1 | 8/2005 | Kaminkow et al. |
| 6,939,226 | B1 | 9/2005 | Joshi |
| 6,958,013 | B2 | 10/2005 | Miereau et al. |
| 6,997,804 | B2 | 2/2006 | Berman |
| 6,997,808 | B2 | 2/2006 | Rodgers et al. |
| 7,040,983 | B2 | 5/2006 | Dolloff et al. |
| 7,040,985 | B2 | 5/2006 | Vancura |
| 7,040,987 | B2 | 5/2006 | Walker et al. |
| 7,048,275 | B2 | 5/2006 | Adams |
| 7,056,209 | B2 | 6/2006 | Baerlocher et al. |
| 7,059,967 | B2 | 6/2006 | Baerlocher |
| 7,070,502 | B1 | 7/2006 | Bussick et al. |
| 7,074,127 | B2 | 7/2006 | Cuddy et al. |

(56) References Cited

U.S. PATENT DOCUMENTS

| | | | |
|---|---|---|---|
| 7,090,580 | B2 | 8/2006 | Rodgers et al. |
| 7,094,148 | B2 | 8/2006 | Baerlocher et al. |
| 7,121,942 | B2 | 10/2006 | Baerlocher |
| 7,169,042 | B2 | 1/2007 | Muir et al. |
| 7,226,359 | B2 | 6/2007 | Bussick et al. |
| 7,252,592 | B2 | 8/2007 | Rodgers et al. |
| 7,331,862 | B2 | 2/2008 | Rodgers et al. |
| 7,331,866 | B2 | 2/2008 | Rodgers et al. |
| 7,347,777 | B2 | 3/2008 | Gauselmann |
| 7,396,279 | B2 | 7/2008 | Berman et al. |
| 7,481,708 | B2 | 1/2009 | Baerlocher et al. |
| 7,530,894 | B1 | 5/2009 | Marks et al. |
| 7,559,837 | B1 | 7/2009 | Yoseloff et al. |
| 2001/0019965 | A1 | 9/2001 | Ochi |
| 2001/0029542 | A1 | 10/2001 | Nishimura |
| 2002/0010017 | A1 | 1/2002 | Bennett |
| 2002/0039919 | A1 | 4/2002 | Joshi et al. |
| 2002/0052229 | A1 | 5/2002 | Halliburton et al. |
| 2002/0077165 | A1 | 6/2002 | Bansemer et al. |
| 2002/0090990 | A1 | 7/2002 | Joshi et al. |
| 2002/0109718 | A1 | 8/2002 | Mansour et al. |
| 2003/0013517 | A1 | 1/2003 | Bennett et al. |
| 2003/0027619 | A1 | 2/2003 | Nicastro |
| 2003/0027628 | A1 | 2/2003 | Luciano |
| 2003/0060267 | A1 | 3/2003 | Glavich et al. |
| 2003/0060276 | A1 | 3/2003 | Walker et al. |
| 2003/0064771 | A1 | 4/2003 | Morrow et al. |
| 2003/0064778 | A1 | 4/2003 | Berman et al. |
| 2003/0064798 | A1 | 4/2003 | Grauzer et al. |
| 2003/0064801 | A1 | 4/2003 | Breckner et al. |
| 2003/0064808 | A1 | 4/2003 | Hecht et al. |
| 2003/0073489 | A1 | 4/2003 | Hecht et al. |
| 2003/0073490 | A1 | 4/2003 | Hecht et al. |
| 2003/0073491 | A1 | 4/2003 | Hecht et al. |
| 2003/0078103 | A1 | 4/2003 | LeMay et al. |
| 2003/0092482 | A1 | 5/2003 | Meyer |
| 2003/0153382 | A1 | 8/2003 | Vancura |
| 2003/0157981 | A1 | 8/2003 | Marks et al. |
| 2003/0190945 | A1 | 10/2003 | Bussick et al. |
| 2003/0203752 | A1 | 10/2003 | Kaminkow et al. |
| 2003/0203753 | A1 | 10/2003 | Muir et al. |
| 2003/0224850 | A1 | 12/2003 | Anderson et al. |
| 2004/0023714 | A1 | 2/2004 | Van Asdale |
| 2004/0033829 | A1 | 2/2004 | Pacey et al. |
| 2004/0048646 | A1 | 3/2004 | Visocnik |
| 2004/0048657 | A1 | 3/2004 | Gauselmann |
| 2004/0053661 | A1 | 3/2004 | Jones et al. |
| 2004/0053676 | A1 | 3/2004 | Rodgers |
| 2004/0053677 | A1 | 3/2004 | Hughs-Baird |
| 2004/0053695 | A1 | 3/2004 | Mattice et al. |
| 2004/0063489 | A1 | 4/2004 | Crumby |
| 2004/0067790 | A1 | 4/2004 | Peterson et al. |
| 2004/0097282 | A1 | 5/2004 | Baerlocher et al. |
| 2004/0142739 | A1 | 7/2004 | Loose et al. |
| 2004/0142747 | A1 | 7/2004 | Pryzby |
| 2004/0209685 | A1 | 10/2004 | Lucchesi et al. |
| 2004/0219969 | A1 | 11/2004 | Casey et al. |
| 2004/0266520 | A1 | 12/2004 | Aida |
| 2005/0020344 | A1 | 1/2005 | Kaminkow |
| 2005/0043090 | A1 | 2/2005 | Pryzby et al. |
| 2005/0049035 | A1 | 3/2005 | Baerlocher et al. |
| 2005/0049036 | A1 | 3/2005 | Mead |
| 2005/0054421 | A1 | 3/2005 | Hughs-Baird et al. |
| 2005/0054440 | A1 | 3/2005 | Anderson et al. |
| 2005/0054442 | A1 | 3/2005 | Anderson et al. |
| 2005/0064924 | A1 | 3/2005 | Glavich et al. |
| 2005/0064926 | A1 | 3/2005 | Walker et al. |
| 2005/0064935 | A1 | 3/2005 | Blanco |
| 2005/0070354 | A1 | 3/2005 | Baerlocher et al. |
| 2005/0101380 | A1 | 5/2005 | Glavich et al. |
| 2005/0130731 | A1 | 6/2005 | Englman et al. |
| 2005/0130737 | A1 | 6/2005 | Englman et al. |
| 2005/0143165 | A1 | 6/2005 | Berman et al. |
| 2005/0148381 | A1 | 7/2005 | Marks et al. |
| 2005/0148384 | A1 | 7/2005 | Marks et al. |
| 2005/0215311 | A1 | 9/2005 | Hornik et al. |
| 2005/0227754 | A1 | 10/2005 | Kaminkow et al. |
| 2005/0277469 | A1 | 12/2005 | Pryzby et al. |
| 2005/0282631 | A1 | 12/2005 | Bonney et al. |
| 2006/0030392 | A1 | 2/2006 | Rodgers et al. |
| 2006/0030401 | A1 | 2/2006 | Mead et al. |
| 2006/0063584 | A1 | 3/2006 | Brill et al. |
| 2006/0068875 | A1 | 3/2006 | Cregan et al. |
| 2006/0068883 | A1 | 3/2006 | Randall et al. |
| 2006/0073876 | A1 | 4/2006 | Cuddy |
| 2006/0084493 | A1 | 4/2006 | Pederson et al. |
| 2006/0084494 | A1 | 4/2006 | Belger et al. |
| 2007/0021188 | A1 | 1/2007 | Rodgers et al. |
| 2007/0060294 | A1 | 3/2007 | Cuddy et al. |
| 2007/0287523 | A1 | 12/2007 | Esses et al. |
| 2008/0139298 | A1 | 6/2008 | Rodgers et al. |
| 2008/0200232 | A1 | 8/2008 | Baerlocher et al. |

FOREIGN PATENT DOCUMENTS

| | | | |
|---|---|---|---|
| AU | 199917318 | A1 | 9/1999 |
| EP | 0 945 837 | A2 | 9/1999 |
| EP | 0 984 408 | A2 | 3/2000 |
| EP | 1 079 345 | A1 | 2/2001 |
| EP | 1 298 601 | A2 | 4/2003 |
| JP | 2002-320713 | A | 11/2002 |
| WO | WO 97/32285 | | 4/1997 |
| WO | WO 00/66235 | | 11/2000 |
| WO | WO 00/76606 | | 12/2000 |
| WO | WO 2004/026417 | | 4/2004 |

OTHER PUBLICATIONS

Break the Spell Article, written by Strictly Slots/Atronic Casion Technology, Ltd., publishded in Sep. 2000.

Break the Spell Atronic Web Page, published by Atronic in Jan. 2001.

Break the Spell Brochure, written by Atronic, published in 1999.

Cash Chameleon Article, written by Strictly Slots/Aristocrat Leisure Industries, PTY Ltd., published in Apr. 2001.

Crazy Fruits Advertisement, written by Atronic, published in 2000.

Crazy Fruits Article, published by Strictly Slots, pulished in 2001.

Description of Symbol Feature in Australian UFO Gaming Machine, written by Barcrest Ltd., published in 1995.

Double Diamond Line Advertisement, written by Bally Gaming Systems, published in 2000.

Enchanted Forest™ Game Description from Aristocrat, published in 1994.

Enchanted Unicorn—Unicorn Bonus Advertisements, written by IGT, published in 2001.

Fishin' Buddies Article, published in Strictly Slots/Anchor Games, published in Apr. 2001.

Introducing the "Smiling Ape" Machine Advertisement (including Joker's Wild Poker description), written by IGT, published prior to 2001.

Jackpot Party Brochures and Articles, published by WMS Gaming, Inc., in 1998.

Leopard Spots Advertisement, published by IGT in Oct. 1999.

Little Green Men, Jr. Advertisement, written by A.C. Coin and Slot Services Company, published prior to 2002.

Loco Loot Article, written by Strictly Slots/Aristocrat Leisure Industries, PTY Ltd., published in May 2002.

Mountain Money Article, written by Strictly Slots/Aristocrat Leisure Industries, PTY Ltd., published in Jun. 2002.

Penguin Pays Advertisement, written by Aristocrat Incorporated, published in 1998.

Reel Power Advertisement, written by Aristocrat, available prior to Oct. 2005.

Screen Shots of "Race Car Bonus Feature," written by IGT, available in Dec. 1998.

Slots 2003 Article, written by Melissa Raimondi, published in Jan. 2003.

The Basics of Winning Video Poker Book Excerpt (Chapter VI Deuces Wile & Chapter VII Jokers Wild), written by J. Edward Allen, published in 1990.

(56) References Cited

OTHER PUBLICATIONS

Wild Streak Article, published by Strictly Slots, published in 2001.
Letter from Reina Kakimoto of Mots Law dated Apr. 9, 2012 regarding Third Party Submission in Published Application Under 37 C.F.R. 1.99 filed for U.S. Appl. No. 13/272,765 (1 page).
Third Party Submission in Published Application Under 37 C.F.R. 1.99 filed for U.S. Appl. No. 13/272,765, dated Apr. 9, 2012 (3 pages).
Partially-highlighted JP 2002-320713A and English translation of paragraphs [0035] and [0037] of same submitted with Third Party Submission in Published Application Under 37 C.F.R. § 1.99 for U.S. Appl. No. 13/272,765, dated Apr. 9, 2012 (3 pages).

GAMING DEVICE HAVING A PLURALITY OF WILDCARD SYMBOL PATTERNS

PRIORITY CLAIM

This application is a continuation of, and claims priority to and the benefit of, U.S. patent application Ser. No. 13/272,765, filed on Oct. 13, 2011, which is a continuation of, and claims priority to and the benefit of, U.S. patent application Ser. No. 11/253,214, filed on Oct. 18, 2005, which issued as U.S. Pat. No. 8,043,155 on Oct. 25, 2011, which is a non-provisional of, and claims priority to and the benefit of, U.S. Provisional Patent Application No. 60/619,806, filed on Oct. 18, 2004, and U.S. Provisional Patent Application No. 60/673,293, filed on Apr. 20, 2005, the entire contents of each of which are incorporated herein by reference.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

FIELD

In general, the present invention relates to methods of using wildcard symbols in a slot machine game. More particularly, the present invention allows players to select patterns of wildcard symbols from a plurality of wildcard symbol patterns and use the selected patterns during one or more subsequent games.

BACKGROUND

Gaming device manufacturers strive to make gaming devices that provide as much enjoyment and excitement as possible. Providing a secondary or bonus game in which a player has an opportunity to win potentially large awards or credits in addition to the awards associated with the primary or base game of the gaming device is one way to enhance player enjoyment and excitement.

Gaming machines or devices provide games, such as slot games, wherein a player has one or more opportunities to obtain a winning symbol combination on mechanical or video reels. In these gaming devices, the player initiates the spin of the reels by making a wager and the positions of the reels after they stop, determines whether a player wins a value and, if so, how much value the player wins. These gaming machines typically have certain features designated for outcomes such as when a player wins a value, when the player advances to a bonus game or when the game terminates.

Gaming devices having bonus or secondary games generally employ a triggering event that occurs during the base or primary game. Certain known gaming devices have one or more bonus or secondary free spin mode or sequences which are provided to the player after the triggering event in the primary game. The triggering event temporarily halts the primary game play and enables a player to enter the free spin mode or sequence wherein one or more free spins are provided to the player. The player plays the free spin mode or sequence, likely receives an award during one or more of the free spins and returns to the base game. Free spin mode or sequences that provide players with large awards or the potential to win large awards are attractive to players.

Another feature that provides players with large awards or the potential to win large awards is a wild symbol. Known gaming devices provide wild symbols that can enable the matching of symbols along a payline to achieve a winning combination by acting or substituting as any other possible symbol for purposes of determining a winning combination.

New methods of playing slot machines, therefore, are required to provide players, casinos, and manufacturers with uniquely entertaining slot machine games.

SUMMARY

The present invention includes a variety of methods to enable the player to select patterns of wildcard symbols, from a plurality of different wildcard symbol patterns, and use the selected patterns during one or more subsequent games.

In one embodiment, the gaming device displays a plurality of selections to a player. Each selection is associated with a pattern of wildcard symbols. Each pattern of wildcard symbols includes one or more wildcard symbols, wherein each wildcard symbol is associated with a different symbol position. For example, a first pattern of wildcard symbols associated with a first selection may include wildcard symbols associated with two symbol positions on the first two reels and a second pattern of wildcard symbols associated with a second selection may include wildcard symbols associated with three symbol positions on the second, third and fourth reels.

In operation, the gaming device enables the player to pick one or more selections. The gaming device reveals the pattern of wildcard symbols associated with the player picked selection. That is, the gaming device reveals which symbol positions are to be associated with wildcard symbols for one or more subsequent games. For one or more subsequent games provided to the player, a plurality of symbols are generated at a plurality of symbol positions, wherein the wildcard symbols associated with the revealed pattern of wildcard symbols remain associated with their respective symbol position. The gaming device determines if any of the generated symbols and any of the associated wildcard symbols form any winning symbol combinations. Any awards associated with any formed winning symbol combinations are provided to the player.

The available patterns differ from each other, with different numbers of wildcard symbols, different types of wildcard symbols, and/or different locations of wildcard symbol in the symbol matrix.

Amongst the available patterns, some may be more advantageous than others. The player's selections, therefore, affect the outcomes of subsequent games using the selected patterns of wildcard symbols.

Other objects, features and advantages will be apparent from the following detailed disclosure, taken in conjunction with the accompanying sheets of drawings, wherein like numerals refer to like parts, elements, components, steps and processes.

DETAILED DESCRIPTION

Figure 1A:
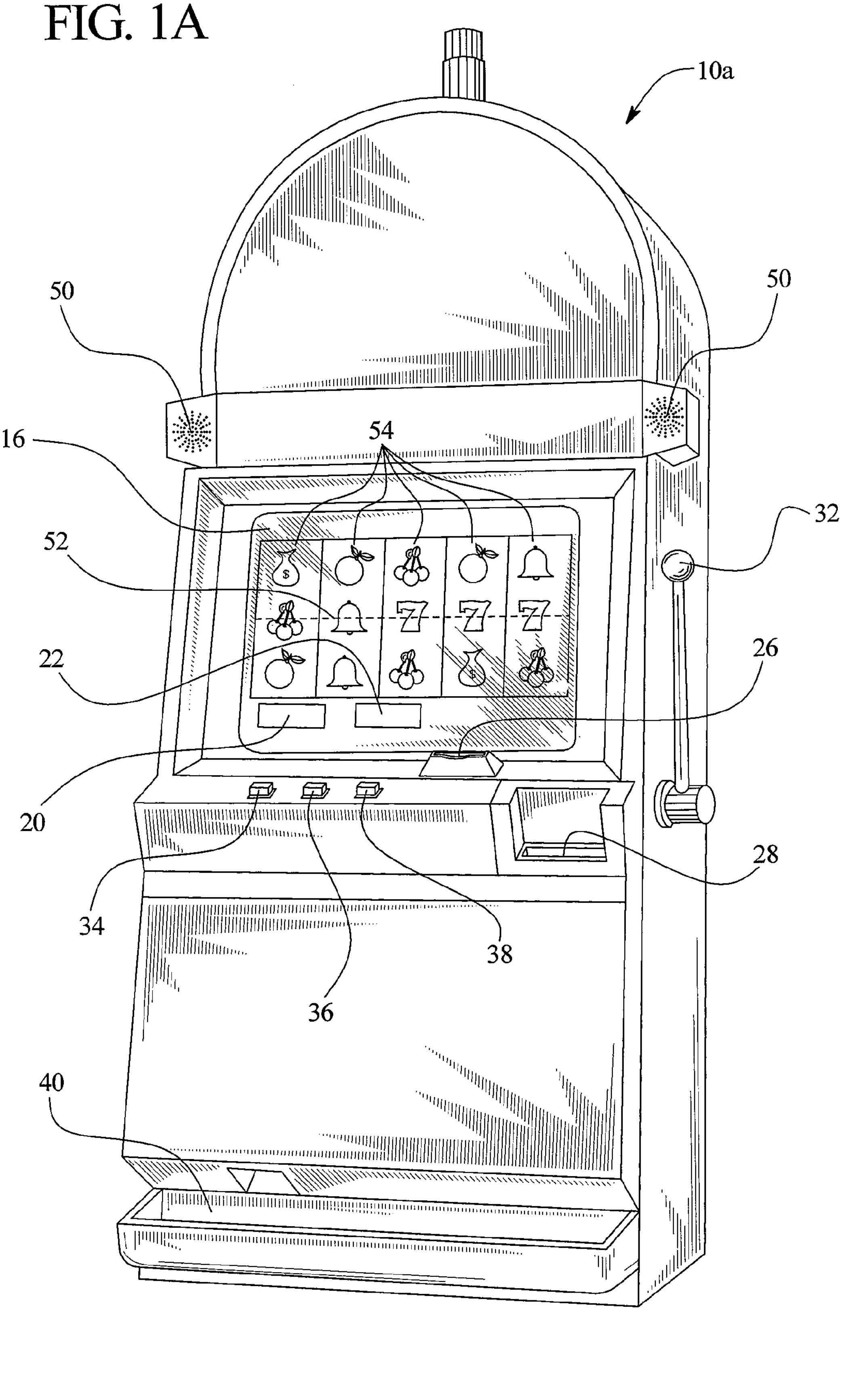
FIG. 1A is a front perspective view of one embodiment of the gaming device disclosed herein.
Figure 1B:
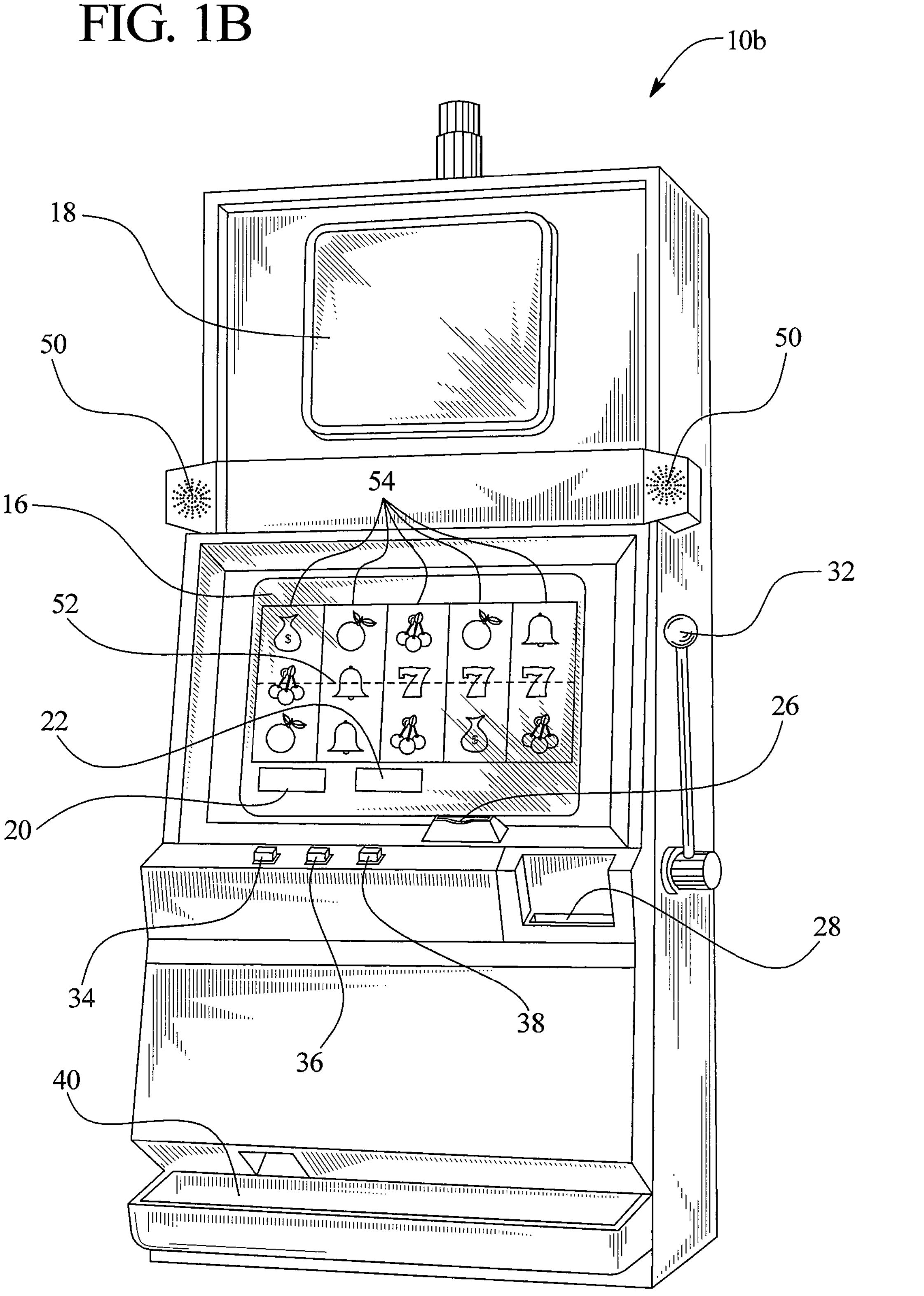
FIG. 1B is a front perspective view of another embodiment of the gaming device disclosed herein.

Referring now to the drawings, two alternative embodiments of the gaming device are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
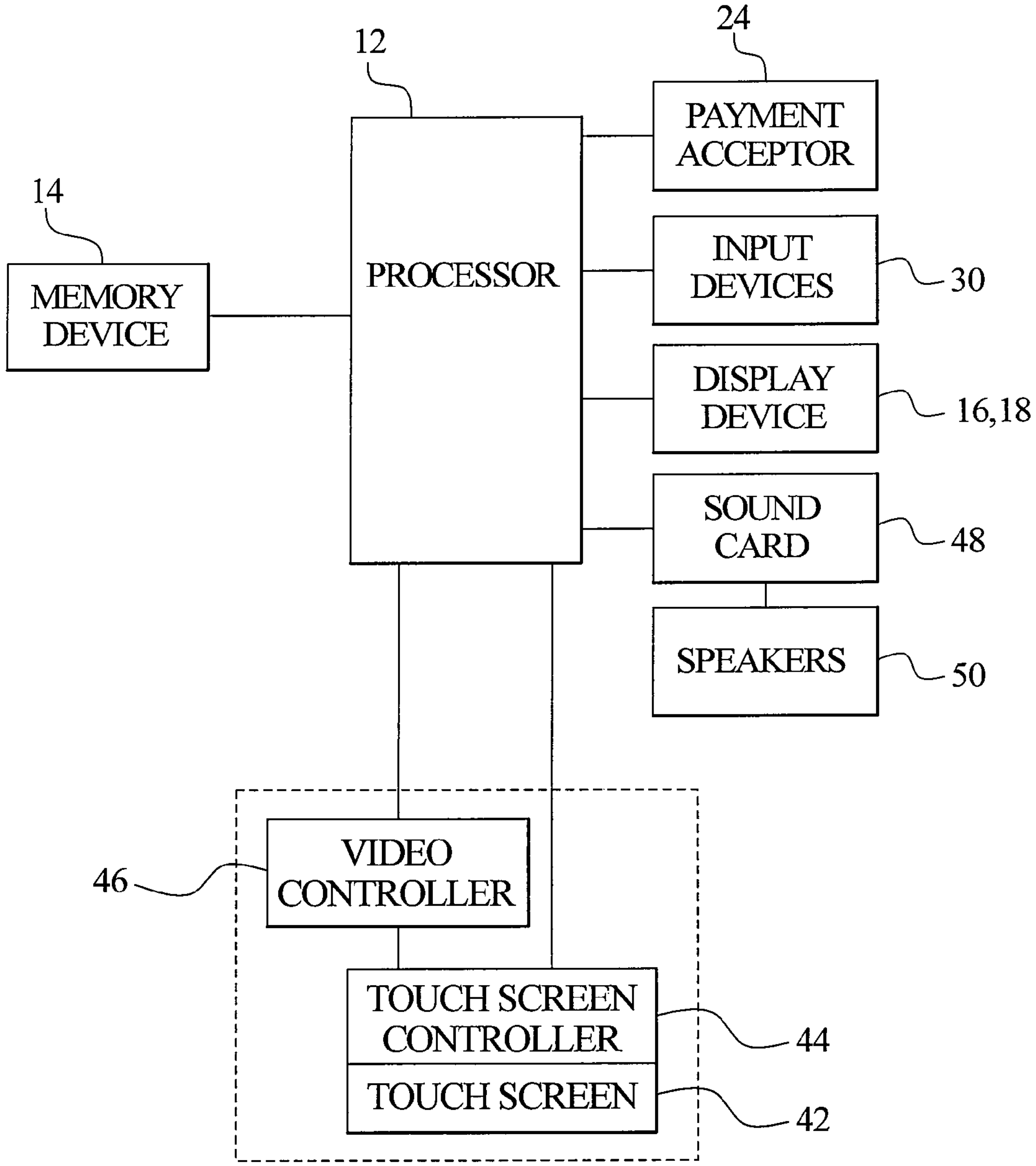
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the art. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome. Such random determination could be provided through utilization of a random number generator (RNG) or other suitable randomization process.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses. In another embodiment, upon a player initiating game play at the gaming device, the gaming device enrolls in a bingo game. In this embodiment, a bingo server calls the bingo balls that result in a specific game outcome. The resultant game outcome is communicated to the individual gaming device to be provided to a player.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. In another embodiment, at least one display device may be a mobile display device, such as a PDA or tablet PC, that enables play of at least a portion of the primary or secondary game at a location remote from the gaming device. As seen in FIGS. 1A and 1B, in one embodiment, the gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display including a projected and/or reflected image or any other suitable electronic device or display mechanism. In one embodiment, as described in more detail below, the display device includes a touch-screen with an associated touch-screen controller. The display devices may be of any suitable configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one Input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device displays at least one and preferably a plurality of reels 54, such as three to five reels 54 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 54 are in video form, one or more of the display devices, as described above, display the plurality of simulated video reels 54. Each reel 54 displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active payline or otherwise occur in a whining pattern, occur on the requisite number of adjacent reels and/or occur in a scatter pay arrangement.

In one embodiment, a base or primary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game could be accomplished through a simple "buy in" by the player if, for example, the player has been unsuccessful at qualifying through other specified activities.

Figure 2B:
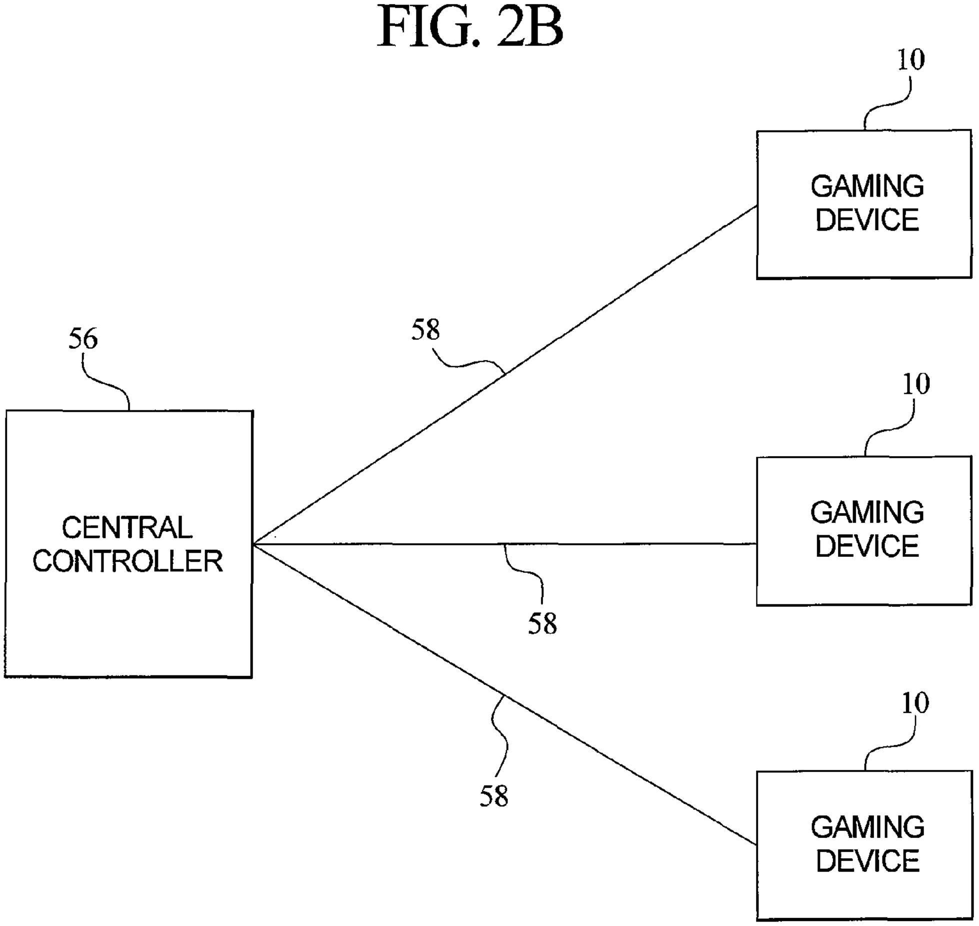
FIG. 2B is a schematic block diagram of one embodiment of a network configuration for a plurality of gaming devices disclosed herein.

In one embodiment, as illustrated in FIG. 2B, one or more of the gaming devices 10 may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo or keno game. In this embodiment, each individual gaming device utilizes one or more bingo or keno games to determine the predetermined game outcome value provided to the player for the interactive game played at that gaming device. In one embodiment, the bingo or keno game is displayed to the player. In another embodiment, the bingo or keno game is not displayed to the player, but the results of the bingo or keno game determine the predetermined game outcome value for the interactive game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a "daub" button (not shown) to initiate the process of the gaming device marking or flagging any selected elements.

After one or more predetermined patterns are marked on one or more of the provided bingo cards, a game outcome is determined for each of the enrolled gaining devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment insures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

In another embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a "chip" to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer. In one embodiment, an individual gaming machine may trigger a progressive win, for example through a game play event such as a symbol-driven trigger. In one embodiment, the central server or other central controller determines when a progressive win is triggered. In one embodiment, a central controller and an individual gaming machine work in conjunction with each other to determine when a progressive win is triggered, for example through an individual gaming machine meeting a predetermined requirement established by the central controller.

Wild Patterns

One embodiment of the gaming device disclosed herein enables the player to select a pattern of wildcard symbols and use the selected pattern during a free spin bonus game.

Figure 3:
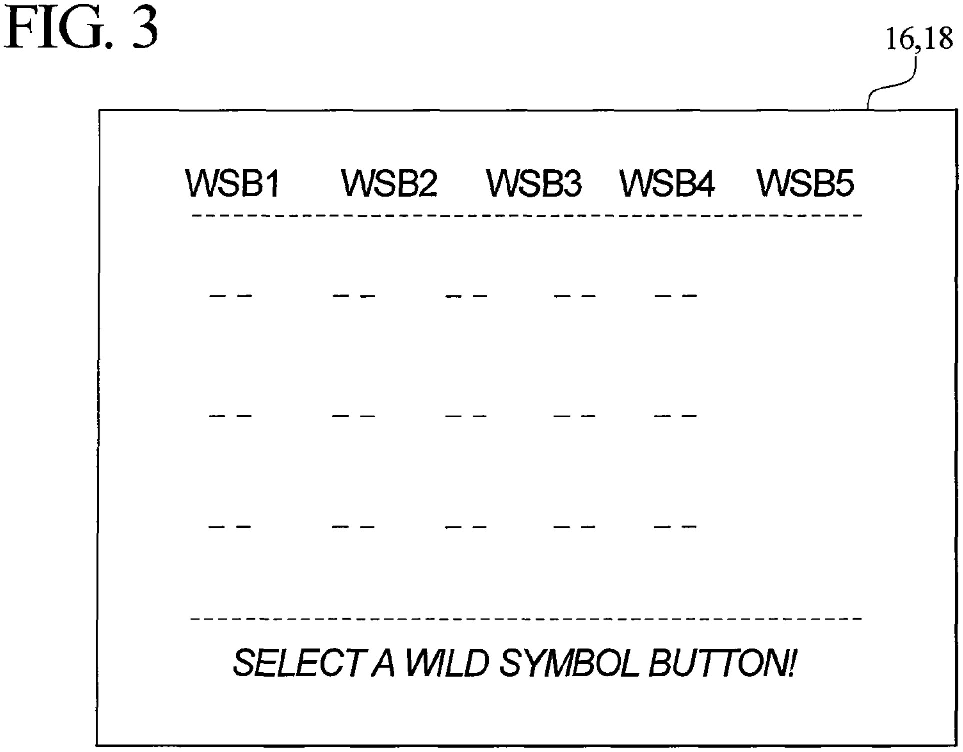
FIGS. 3, 4, 5, 6 7, and 8 are elevation views of one of the display devices of the gaming device illustrating the selection of a pattern of wildcard symbols and the use of the selected pattern during a free spin bonus game

FIG. 3 illustrates one embodiment with a plurality of wild patterns operating in a 3-row by 5-column symbol matrix with 15 symbol positions. In this embodiment, one of five WS symbols (i.e., WS1 to WS5) is assigned to each position and five Wild Symbol buttons (i.e., WSB1 to WSB5) are displayed above the symbol matrix. The gaming device enables the player to select one of the WSB buttons. Appropriate messages such as "SELECT A WILD SYMBOL BUTTON!" are preferably provided to the player visually, or through suitable audio or audiovisual displays.

Figure 4:
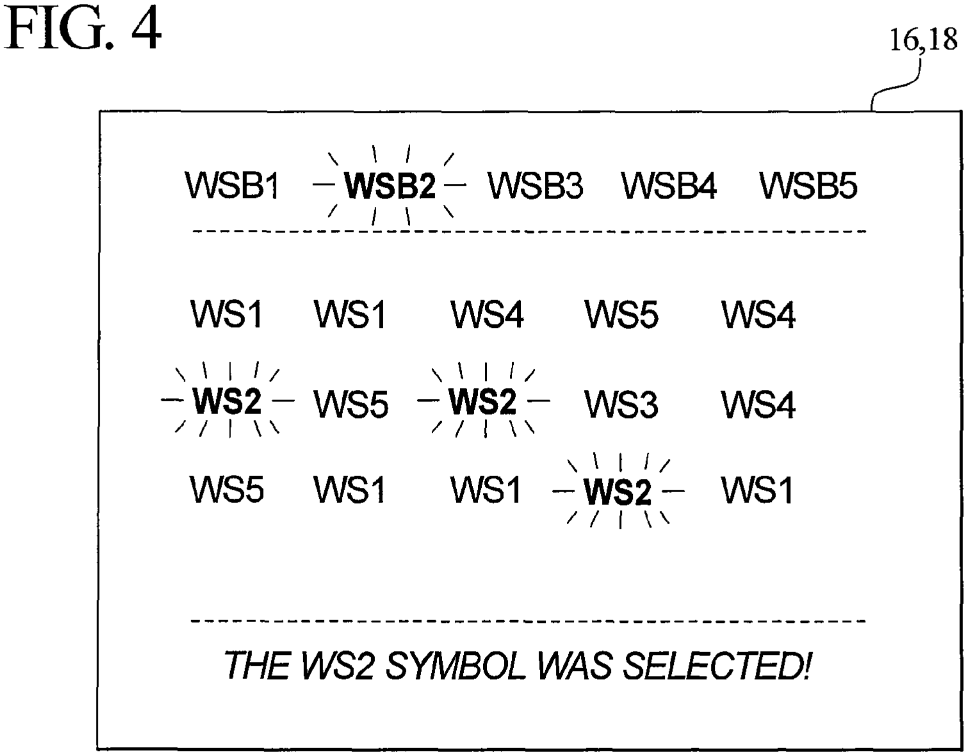

FIG. 4 illustrates the player's selection of a Wild Symbol button, in this case the WSB2 button, and the appearance of all WS symbols in the symbol matrix. The player picked WSB2 button activated all of the WS2 symbols in the symbol matrix and the gaming device highlights the selected WSB2 button and the associated WS2 symbols. Appropriate messages such as "THE WS2 SYMBOL WAS SELECTED!" are preferably provided to the player visually, or through suitable audio or audiovisual displays. It should be appreciated that if an alternate button, such as the WSB1 button, was selected, all of the symbols associated with the alternative selected button, such as the WS1 symbols, would be revealed.

Figure 5:
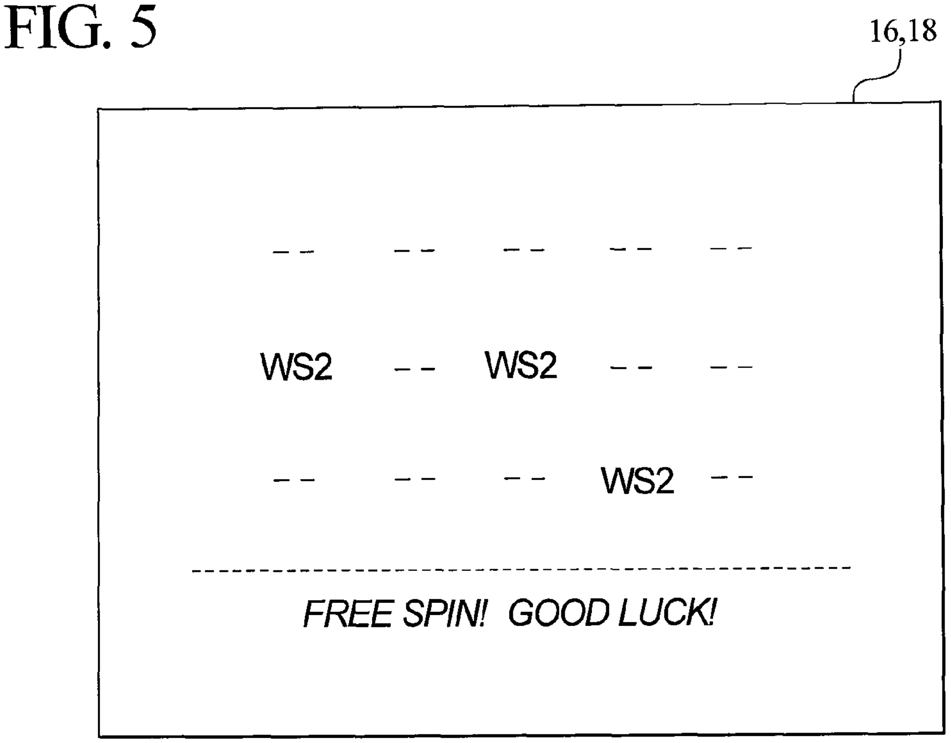

FIG. 5 shows the first free spin during which the symbol matrix only displays the selected WS2 symbols with the other WS symbols and WSB buttons disappearing. Appropriate messages such as "FREE SPIN!" and "GOOD LUCK" are preferably provided to the player visually, or through suitable audio or audiovisual displays.

Figure 6:
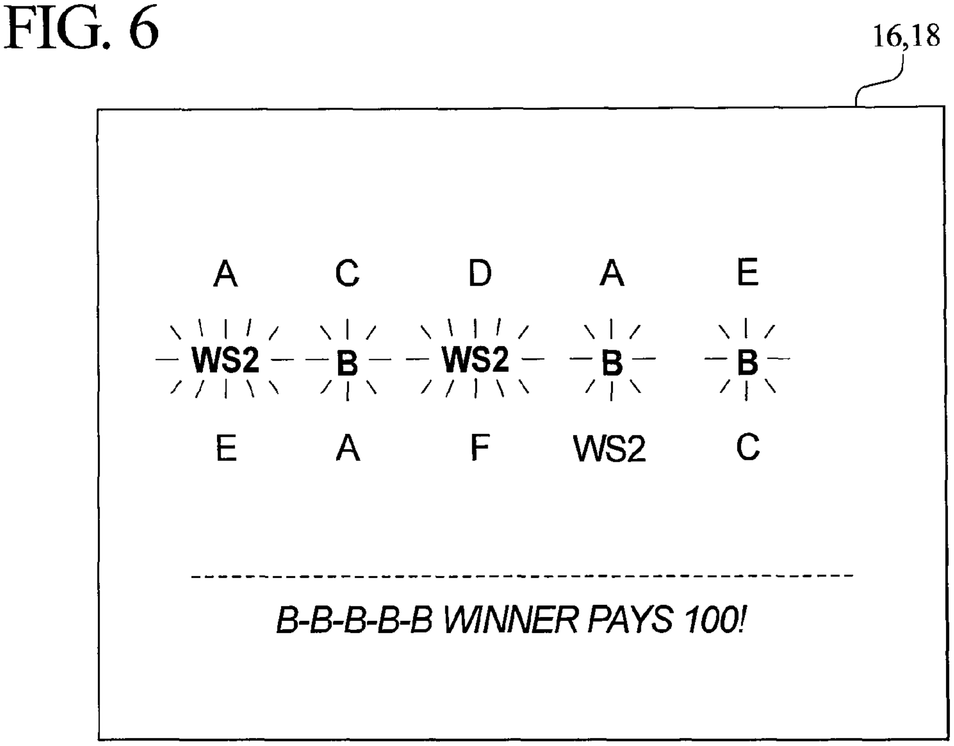

FIG. 6 illustrates the results of the first free spin with symbols A to F randomly appearing in the empty positions of the symbol matrix. Winning symbol combinations, if any, generate awards. In this embodiment, the WS2 wildcard symbols help form winning symbol combinations by replacing any other symbol. In the example above, the WS2 symbols replace "B" symbols to form the winning "B-B-B-B-B" symbol combination. The game issues the award for B-B-B-B-B according to a pay schedule or paytable. Appropriate messages such as "B-B-B-B-B WINNER PAYS 100!" are preferably provided to the player visually, or through suitable audio or audiovisual displays.

Figure 7:
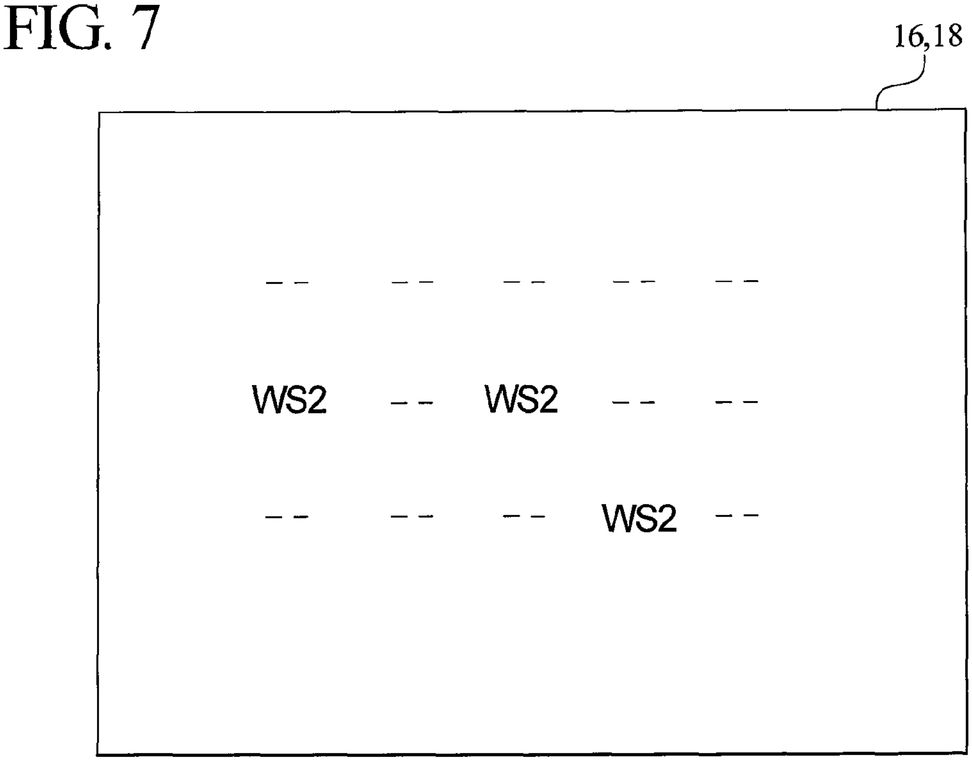

FIG. 7 shows the second free spin in which symbols A to F disappear and only the selected WS2 symbols remain displayed. Each WS2 symbols remains fixed in the same position in the symbol matrix.

Figure 8:
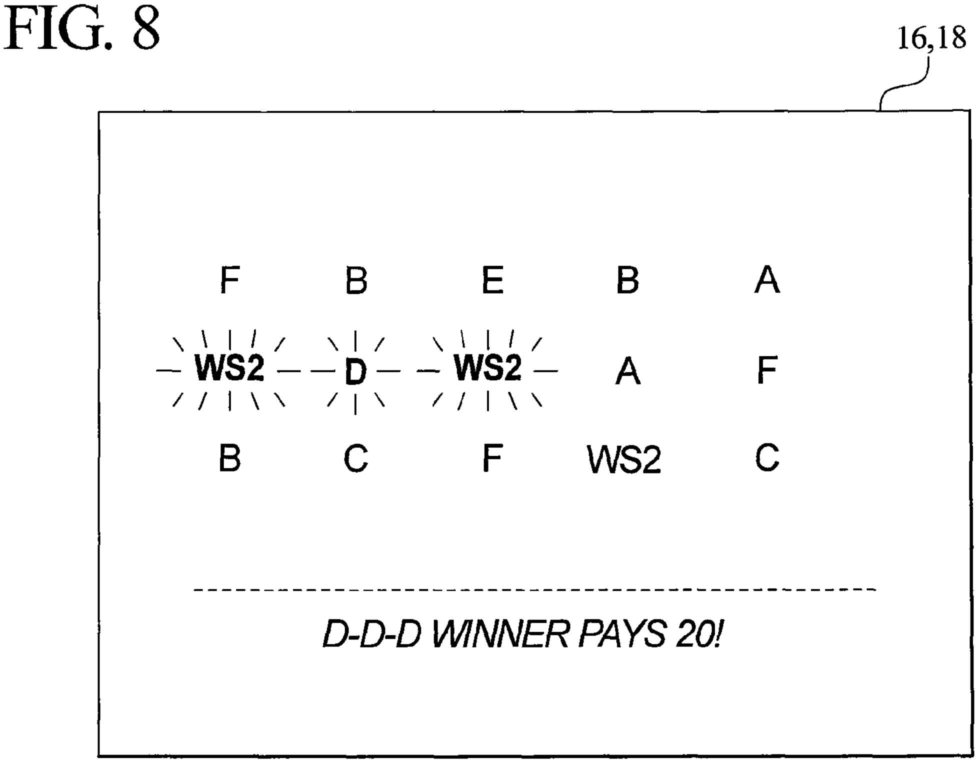

FIG. 8 illustrates the results of the second free spin with symbols A to F randomly appearing in the empty positions of the symbol matrix. Winning symbol combinations, if any, generate awards. Again, the WS2 wildcard symbols help form winning symbol combinations by replacing any other symbol. In the example above, the WS2 symbols replace "D" symbols to form the winning "D-D-D" symbol combination. The game issues the award for D-D-D according to a pay schedule or paytable. Appropriate messages such as "D-D-D WINNER PAYS 20!" are preferably provided to the player visually, or through suitable audio or audiovisual displays.

In this embodiment, as the Wild Pattern bonus game continues, the WS2 symbols retain in their pattern positions and continue to replace any symbol to help form winning symbol combinations. After the free spins play out, the bonus game ends and the base or primary game resumes.

In addition to the preferred embodiment, as described above, the present invention may be modified in one or more aspects, including but not limited to the following alternative embodiments:

In one embodiment, a player may select from any number of wildcard symbol patterns. For example, a player may select one of twelve patterns. In different embodiments, the number of wildcard symbol patterns which the player may select from is predetermined, randomly determined, determined based on the player's wager, determined based on the player's status (such as determined through a player tracking system), determined based on time or determined based on any other suitable method.

In another embodiment, a player may select from any number of same or different patterns. For example, a player may select from 10 patterns of which 5 are the same as each other and the remaining 5 are all different from each other.

In another embodiment, a player may select from patterns with any number of wildcard symbols. For example, a player may select from one pattern with a single wildcard symbol and another pattern with ten wildcard symbols. In different embodiments, the number of wildcard symbols in the patterns of wildcard symbols is predetermined, randomly determined, determined based on the player's wager, determined based on the player's status (such as determined through a player tracking system), determined based on time or determined based on any other suitable method.

In another embodiment, a player may select any number of patterns from the available choices. For example, a player may select 3 patterns out of 9 available patterns. In different embodiments, the number of wildcard symbol patterns which the player may select is predetermined, randomly determined, determined based on the player's wager, determined based on the player's status (such as determined through a player tracking system), determined based on time or determined based on any other suitable method.

In another embodiment, multiple selected patterns of wildcard symbols may function in the same symbol matrix. For example, one pattern may place wildcard symbols in columns 1 and 2 and another pattern may place wildcard symbols in columns 4 and 5. In different embodiments, the number of wildcard symbol patterns which function in the same symbol matrix is predetermined, randomly determined, determined based on the player's wager, determined based on the player's status (such as determined through a player tracking system), determined based on time or determined based on any other suitable method.

In another embodiment, multiple selected patterns of wildcard symbols may alternate in the same symbol matrix. For example, a first pattern of wildcard symbols may appear for spins 1 to 3 and a second pattern appears from spins 4 to 6.

In another embodiment, a pattern may include wildcard symbols with any enhancement properties. For example, one wildcard symbol enhances winning combinations using the wildcard by 2 times and another wildcard symbol enhances winning combinations using the wildcard by 10 times.

In another embodiment, a pattern may include wildcard symbols with any replacement properties. For example, one wildcard symbol replaces any symbol in the symbol set and another wildcard symbol only replaces a subset of the symbol set.

In another embodiment, a player may use any method to select patterns of wildcard symbols, including touch-sensitive video screens, hard-wired buttons, voice recognition, or any other suitable method to indicate the player's preference.

In another embodiment, a pattern of wildcard symbols may endure for any period, including number of spins, amount wagered, amount won or lost, time, or any other quantifiable period. For example, a wildcard pattern may endure for 5 minutes. In different embodiments, the duration each wildcard symbol pattern endures is predetermined, randomly determined, determined based on the player's wager, determined based on the player's status (such as determined through a player tracking system), determined based on time or determined based on any other suitable method.

In another embodiment, a pattern of wildcard symbols may be of any size of 2 symbol positions or greater. For example, a pattern of wildcard symbol may occupy 13 of the 15 symbol positions in a symbol matrix. In different embodiments, the number of symbol positions a pattern of wildcard symbols occupies is predetermined, randomly determined, determined based on the player's wager, determined based on the player's status (such as determined through a player tracking system), determined based on time or determined based on any other suitable method.

In another embodiment, a pattern of wildcard symbols may change size from spin to spin. For example, a pattern of wildcard symbols may start with 13 positions and decrease 1 position every spin; or, a pattern of wildcard symbols may start with 2 positions and increase 1 position every spin.

In another embodiment, a pattern of wildcard symbols may change symbol types from spin to spin. For example, a pattern start with wildcard symbols with 2 times enhancement values and increase the enhancement value by 1 with every spin.

In another embodiment, patterns may include wildcard symbols located anywhere in the symbol matrix. For example, a pattern may include wildcard symbols in all four corners of the symbol matrix.

In another embodiment, bonus games using patterns of wildcard symbols may trigger using any method. For example, any 3 or more bonus initiator symbols on a payline triggers a bonus game with patterns of wildcard symbols.

In another embodiment, the present invention operates as a base game. For example, the present invention operates as a base slot machine game in which players select patterns of wildcard symbols for each spin.

In another alternative embodiment, the gaming device provides a five-reel, fifty-payline video slot machine game that allows the player to place two or more wagers on a selected payline, with each wager providing a unique set of awards. In this embodiment, the first wager ("base wager") buys line pays and scatter pays; and the second wager ("bonus wager") buys one of five bonus events.

In this alternative embodiment, a player must place a base wager on selected paylines and then decide whether or not the place an equal value, bonus wager on the same paylines. For example, a player may select twenty-five pay lines, place a base wager of five credits on each of the selected pay lines, and then place a bonus wager of five credits on each of the same selected pay lines.

Alternatively, the two wagers may be independent of each other. The player may place a base and bonus wagers on different pay lines. The player may also place base and bonus wagers of differing values on the pay lines. For example, a player may place a base wager on paylines 1 to 25, but only place lesser valued, bonus wagers on paylines 20 to 35.

In another embodiment, the gaming device displays a character or symbol uncovering a pattern of wild symbols in a symbol matrix. This symbol matrix, with wild symbol pattern, is then used during free spins to provide winning outcomes. For example, a symbol matrix with wild symbols in all positions of columns 2 and 5 may be used throughout 10 free spins.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming system comprising:

at least one input device;

at least one processor;

at least one display device; and at least one memory device storing a plurality of instructions which, when executed by the at least one processor, cause the at least one processor to operate with the at least one display device and the at least one input device to:

(a) display a game associated with a plurality of non-wild symbols and at least one wild symbol, said symbols displayable at a plurality of symbol positions in a symbol matrix;

(b) cause a pick of one of a plurality of different patterns of the symbol positions, each of the different patterns of the symbol positions including at least two predefined symbol positions in the symbol matrix; and (c) for a play of the game:

(i) display the wild symbol at each of the predefined symbol positions in the symbol matrix included in the picked pattern;

(ii) independent from and in addition to the pick of said pattern, randomly generate a plurality of the non-wild symbols;

(iii) after the wild symbol is displayed at each of the predefined symbol positions in the symbol matrix included in the picked pattern, display the generated non-wild symbols at a plurality of the symbol positions in the symbol matrix;

(iv) determine any awards associated with any winning combinations of the displayed symbols; and (v) display any determined awards.

2. The gaming system of claim 1, wherein the plurality of instructions, when executed by the at least one processor, cause the at least one processor to provide (c) for each of a plurality of plays of the game.

3. The gaming system of claim 1, wherein the plurality of instructions, when executed by the at least one processor, cause the at least one processor to:

(a) operate with the at least one display device to display a plurality of selections, each of the selections being associated with a different one of the patterns; and (b) cause the pick of one of the patterns by causing a pick of one of the displayed selections.

4. The gaming system of claim 1, wherein the plurality of instructions, when executed by the at least one processor, cause the at least one processor to operate with the at least one display device, for said play of the game, to not display any non-wild symbols at the predefined symbol positions in the symbol matrix included in the picked pattern.

5. The gaming system of claim 1, wherein the plurality of instructions, when executed by the at least one processor, cause the at least one processor to operate with the at least one input device to receive the pick of one of the patterns from a player.

6. The gaming system of claim 1, wherein the plurality of instructions, when executed by the at least one processor, cause the at least one processor to cause a pick of a plurality of the patterns.

7. A method of operating a gaming system, said method comprising:

(a) causing at least one processor to execute a plurality of instructions stored in at least one memory device to operate with at least one display device to display a game associated with a plurality of non-wild symbols and at least one wild symbol, said symbols displayable at a plurality of symbol positions in a symbol matrix;

(b) causing the at least one processor to execute the plurality of instructions to cause a pick of one of a plurality of different patterns of the symbol positions, each of the different patterns of the symbol positions including at least two predefined symbol positions in the symbol matrix; and (c) for a play of the game, causing the at least one processor to execute the plurality of instructions to:

(i) operate with the at least one display device to display the wild symbol at each of the predefined symbol positions in the symbol matrix included in the picked pattern;

(ii) independent from and in addition to the pick of said pattern, randomly generate a plurality of the non-wild symbols;

(iii) after the wild symbol is displayed at each of the predefined symbol positions in the symbol matrix included in the picked pattern, operate with the at least one display device to display the generated non-wild symbols at a plurality of the symbol positions in the symbol matrix;

(iv) determine any awards associated with any winning combinations of the displayed symbols; and (v) operate with the at least one display device to display any determined awards.

8. The method of claim 7, which includes providing (c) for each of a plurality of plays of the game.

9. The method of claim 7, which includes causing the at least one processor to execute the plurality of instructions to:

(a) operate with the at least one display device to display a plurality of selections, each of the selections being associated with a different one of the patterns; and (b) cause the pick of one of the patterns by causing a pick of one of the displayed selections.

10. The method of claim 7, which includes causing the at least one processor to execute the plurality of instructions to operate with the at least one display device, for said play of the game, to not display any non-wild symbols at the predefined symbol positions in the symbol matrix included in the picked pattern.

11. The method of claim 7, which includes causing the at least one processor to execute the plurality of instructions to operate with at least one input device to receive the pick of one of the patterns from a player.

12. The method of claim 7, which includes causing the at least one processor to execute the plurality of instructions to cause a pick of a plurality of the patterns.

13. The method of claim 7, which is provided through a data network.

14. The method of claim 13, wherein the data network is an internet.

15. A non-transitory computer readable medium storing a plurality of instructions which, when executed by at least one processor, cause the at least one processor to:

(a) cause at least one display device to display a game associated with a plurality of non-wild symbols and at least one wild symbol, said symbols displayable at a plurality of symbol positions in a symbol matrix;

(b) cause a pick of one of a plurality of different patterns of the symbol positions, each of the different patterns of the symbol positions including at least two predefined symbol positions in the symbol matrix; and (c) for a play of the game:

(i) cause the at least one display device to display the wild symbol at each of the predefined symbol positions in the symbol matrix included in the picked pattern;

(ii) independent from and in addition to the pick of said pattern, randomly generate a plurality of the non-wild symbols;

(iii) after the wild symbol is displayed at each of the predefined symbol positions in the symbol matrix included in the picked pattern, cause the at least one display device to display the generated non-wild symbols at a plurality of the symbol positions in the symbol matrix;

(iv) determine any awards associated with any winning combinations of the displayed symbols; and (v) cause the at least one display device to display any determined awards.

16. The non-transitory computer readable medium of claim 15, wherein the plurality of instructions, when executed by the at least one processor, cause the at least one processor to perform (c) for each of a plurality of plays of the game.

17. The non-transitory computer readable medium of claim 15, wherein the plurality of instructions, when executed by the at least one processor, cause the at least one processor to:

(a) cause the at least one display device to display a plurality of selections, each of the selections being associated with a different one of the patterns; and (b) cause the pick of one of the patterns by causing a pick of one of the displayed selections.

18. The non-transitory computer readable medium of claim 15, wherein the plurality of instructions, when executed by the at least one processor, cause the at least one processor to cause the at least one display device, for said play of the game, to not display any non-wild symbols at the predefined symbol positions in the symbol matrix included in the picked pattern.

19. The non-transitory computer readable medium of claim 15, wherein the plurality of instructions, when executed by the at least one processor, cause the at least one processor to operate with the at least one input device to receive the pick of one of the patterns from a player.

20. The non-transitory computer readable medium of claim 15, wherein the plurality of instructions, when executed by the at least one processor, cause the at least one processor to cause a pick of a plurality of the patterns.

* * * * *

UNITED STATES PATENT AND TRADEMARK OFFICE

CERTIFICATE OF CORRECTION

PATENT NO. : 8,727,866 B2
APPLICATION NO. : 13/855339
DATED : May 20, 2014
INVENTOR(S) : Anthony M. Singer et al.

It is certified that error appears in the above-identified patent and that said Letters Patent is hereby corrected as shown below:

IN THE CLAIMS

In Claim 19, Column 18, Line 44, delete the first instance of "the".

Signed and Sealed this
Sixteenth Day of September, 2014

Michelle K. Lee
*Deputy Director of the United States Patent and Trademark Office*